United States Patent
Miller

(10) Patent No.: US 8,360,199 B2
(45) Date of Patent: Jan. 29, 2013

(54) INTEGRATED MASS AIR FLOW SENSOR AND BROADBAND SILENCER

(75) Inventor: Stuart Miller, St. Kalamazoo, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 1656 days.

(21) Appl. No.: 11/802,075

(22) Filed: May 18, 2007

(65) Prior Publication Data

US 2007/0292816 A1   Dec. 20, 2007

Related U.S. Application Data

(60) Provisional application No. 60/809,019, filed on May 30, 2006.

(51) Int. Cl.
*F02M 35/12* (2006.01)
*F02M 35/00* (2006.01)

(52) U.S. Cl. .................. 181/229; 181/212; 123/184.21; 123/184.61

(58) Field of Classification Search .............. 60/258, 60/725; 123/184.53, 184.6, 295, 350; 73/118.02; 181/204, 212, 214, 229, 240, 265
See application file for complete search history.

(56) References Cited

U.S. PATENT DOCUMENTS

| | | | |
|---|---|---|---|
| 5,325,712 A | 7/1994 | Tsutsui et al. | |
| 5,548,093 A * | 8/1996 | Sato et al. | 181/224 |
| 6,688,425 B2 * | 2/2004 | Cole et al. | 181/264 |
| 7,416,580 B2 * | 8/2008 | Nyman et al. | 95/90 |
| 2003/0066706 A1 | 4/2003 | Cole et al. | |
| 2005/0284692 A1 | 12/2005 | McWilliam et al. | |

FOREIGN PATENT DOCUMENTS

| | | |
|---|---|---|
| DE | 196 38 304 A1 | 4/1997 |
| DE | 197 03 414 A1 | 8/1998 |
| DE | 197 48 853 A1 | 12/1998 |
| DE | 199 60 427 C1 | 2/2001 |

OTHER PUBLICATIONS

European Search Report dated Oct. 24, 2008 with an English translation of the relevant portions (Nine (9) pages).

* cited by examiner

*Primary Examiner* — Nathaniel Wiehe
*Assistant Examiner* — Kevin Lathers

(57) ABSTRACT

An integrated mass air flow sensor/broadband silencer assembly comprises a molded body having a plurality of walls formed therein. The molded body is over-wrapped with a layer of acoustic foam that, together with the plurality of walls, define a plurality of chambers within an interior volume of the assembly. A mass air flow sensor can be inserted into one of the chambers. The chambers are sized and spaced to provide a uniform velocity, low turbulence air flow to the sensor, and a minimally-restricted air flow to an internal combustion engine located downstream of the assembly.

29 Claims, 3 Drawing Sheets ns shown in
INTEGRATED MASS AIR FLOW SENSOR AND BROADBAND SILENCER

BACKGROUND OF THE INVENTION

The invention relates to an assembly comprising an integrated mass air flow sensor and a broadband silencer that is adapted for use in the air induction system of an internal combustion engine.

In many internal combustion engines, a mass air flow sensor (MAFS) is used to measure the air flow rate entering the engine and, in turn, provide an output signal that is used to maintain a desired air-fuel ratio. Maintaining a desired air-fuel ratio is important to achieve optimal engine performance, fuel economy, and engine emissions.

Because the output signal, and in particular the signal-to-noise ratio of a typical mass air flow sensor can be adversely affected by air turbulence, mass air flow sensors preferably measure air flow having uniform velocity and minimal turbulence over the complete range of engine operating conditions.

The effect of air turbulence on a mass air flow sensor can be particularly problematic under conditions of low flow rate such as during engine idling. Moreover, low flow rate turbulence and its attendant adverse impact on MAFS output can be exacerbated if the MAFS is located in a relatively large diameter flow path.

Many high performance internal combustion engines such as those having turbochargers or superchargers require high intake air flow rates. These high flow rates are usually achieved by providing relatively large diameter flow paths in the air induction system. In addition to requiring high intake air flow rates, such high performance engines preferably project a particular acoustic signature, which can be obtained by incorporating into the air induction system an acoustic device such as a tunable (e.g., broadband) silencer.

The space available for components such as mass air flow sensors and broadband silencers is typically limited due to design and esthetic considerations. Furthermore, the high flow rates required by many high performance engines are at odds with the low turbulence requirements of mass air flow sensors that are included in these engines.

Accordingly, it would be advantageous to provide a broadband silencer and a mass air flow sensor that are compatible with both the flow rate and the space requirements of many high performance engines.

SUMMARY OF THE INVENTION

It is an object of the invention to provide a device comprising a mass air flow sensor integrated with a broadband silencer that is adapted for use in the air induction system of an internal combustion engine.

Another object of the invention is to provide an air induction system adapted to provide a consistent and uniform air flow to a mass air flow sensor under the full range of engine operation conditions while minimally restricting air flow to the engine.

A further object of the invention is to provide an air induction system adapted to controllably reduce acoustic emissions.

A still further object of the invention is to provide an assembly comprising an integrated mass air flow sensor and a broadband silencer having a compact design.

These and other objects are achieved in accordance with the present invention by providing an air induction assembly adapted to be incorporated in an air intake system of an internal combustion engine. The air induction assembly comprises a housing, a substantially cylindrical molded body fitted within said housing, a layer of wire mesh formed over a circumferential outer surface of the molded body, a layer of acoustic foam formed over an outer surface of the wire mesh, and a mass air flow sensor inserted into an inner volume of the molded body.

The molded body, which has an upstream segment and a downstream segment, comprises a first wall extending along a longitudinal axis of the molded body, said first wall comprising a plurality of perforations within the upstream segment, a second wall formed within said downstream segment orthogonal to the first wall and aligned with a longitudinal axis of the molded body, a plurality of rings formed within the downstream segment, each ring being concentrically aligned with respect to a longitudinal axis of the molded body and having a central circular opening, and a mass air flow sensor flow tube formed within the upstream segment and aligned with a longitudinal axis of the molded body. The mass air flow sensor flow tube bifurcates the first wall within the upstream segment.

According to one embodiment, the perforations are sized and spaced to reduce the intensity of low frequency vibrations emitted from the upstream segment. According to a further embodiment, the plurality of rings are sized and spaced to reduce the intensity of high frequency vibrations emitted from the downstream segment. Advantageously, the mass air flow sensor is located within the mass air flow sensor flow tube.

According to yet a further embodiment, a method of forming an air induction assembly comprises (i) forming a substantially cylindrical molded body having an upstream segment and a downstream segment (ii) wrapping a layer of wire mesh over a circumferential outer surface of the molded body (iii) wrapping a layer of acoustic foam over an outer surface of the wire mesh to form a pre-assembly (iv) inserting the pre-assembly into a housing, and (v) inserting a mass air flow sensor into an inner volume of the molded body to form the assembly.

These and other features of preferred embodiments of the invention, in addition to being set forth in the claims, are also disclosed in the specification and/or in the drawings, and the individual features each may be implemented in embodiments of the invention either individually or in the form of sub-combinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
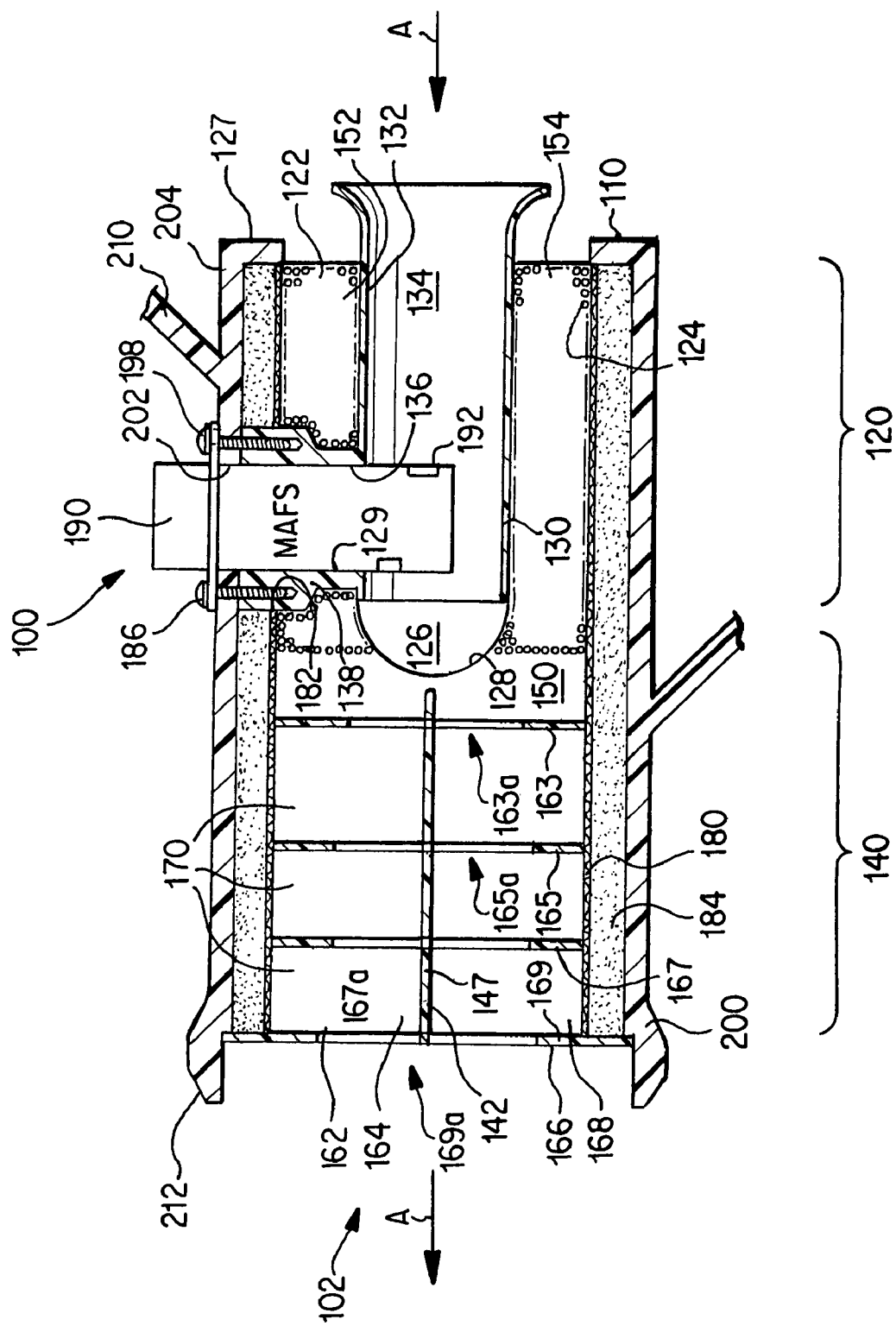
FIG. 1 shows an integrated mass air flow sensor/broadband silencer assembly according to a first embodiment of the invention.
Figure 3:
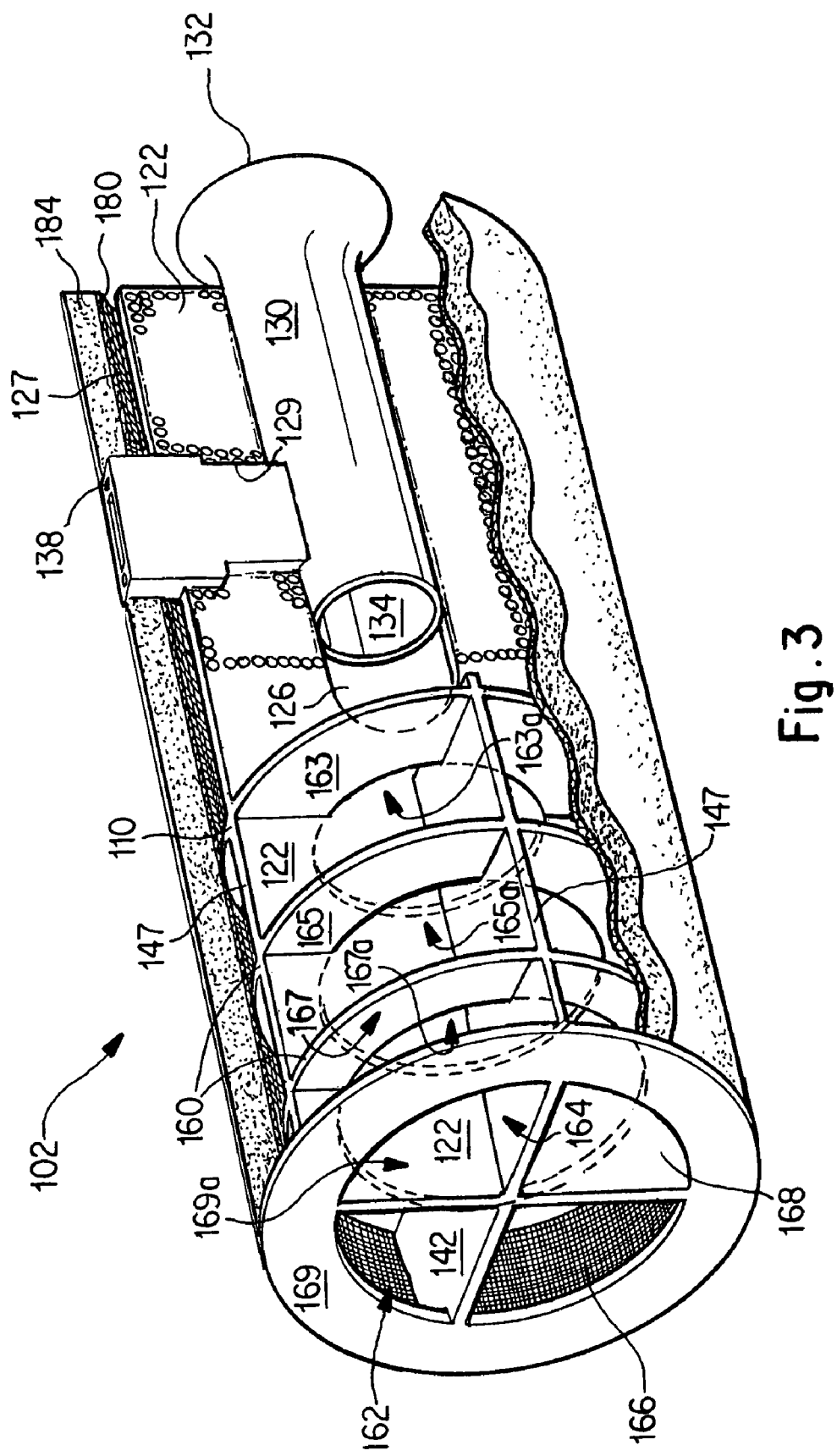
FIG. 3 shows a perspective view of a pre-assembly.

Referring to FIG. 1, shown is a cross-sectional illustration of an integrated mass air flow sensor/broadband silencer assembly according to a first embodiment. The assembly 100 includes a pre-assembly 102 comprising a molded body 110, a layer of wire mesh 180 and a layer of acoustic foam 184. The wire mesh and acoustic foam are wrapped over an outer circumferential periphery of the molded body and define a pre-assembly having a substantially cylindrical shape. A perspective view of pre-assembly 102 is shown in FIG. 3.

The molded body, which is preferably a unitary part, comprises a plurality of walls, a mass air flow sensor flow tube 130, and an optional pair of fastener receiving portions 138. The molded body is divided into an upstream segment 120 and a downstream segment 140. In one embodiment, the length of the upstream segment 120 is preferably approximately equal to the length of the downstream segment 140.

The wire mesh, which provides support for the layer of acoustic foam, is supported by outer radial edges of the molded body as described further below. As air passes through the assembly, sound waves are dampened by the outer layer of acoustic foam. The over-wrapped wire mesh and acoustic foam define an interior volume 150 of the assembly.

In an assembled state, the pre-assembly is inserted into a housing 200. According to one embodiment, the housing can comprise an outlet 204 in an air induction system. For example, outlet 204 can be formed in a wall 210 of an air box cover. With the pre-assembly inserted into the housing, a completed assembly 100 can be formed by inserting a mass air flow sensor 190 into the interior volume 150 via apertures formed in housing 200, acoustic foam 184, wire mesh 180 and a mass air flow sensor flow tube. In its assembled configuration, a sensing portion 192 of the mass air flow sensor 190 is located within MAFS flow tube 130. Preferably, the sensing portion 192 is concentrically aligned with respect to the flow tube.

The plurality of walls formed in the molded body divide the interior volume 150 into a plurality of flow chambers. The flow chambers are adapted to provide an acoustic silencing (e.g., damping) effect over a broad range of frequencies. The flow chambers are further adapted to provide uniform air flow to the mass air flow sensor 190 while minimally restricting the air flow through the assembly to an internal combustion engine located downstream. As illustrated in FIG. 1, airflow passes through the assembly during use in the direction indicated by arrows A.

A first wall 122, which is formed along a diameter of the axial cross section of the pre-assembly, divides the upstream segment of the interior volume 150 into two main axial chambers 152, 154. The first wall 122 runs the full length of the assembly while the two main chambers run the length of the upstream segment 120. Intake air, and thus sound waves, traveling through the interior volume of the assembly travel via these two main chambers.

In the upstream segment, a plurality of perforations 124 are formed in the first wall 122. According to one embodiment, the size of the perforations can range from about 0.1 to 5 mm. In most cases, the size of the perforations will be in the range from about 0.1 to 2 mm. The size and spacing of the perforations are preferably selected in order to reduce the intensity of low frequency vibrations (e.g., 200 to 1500 Hz vibrations) caused by air flow through the upstream segment of the assembly.

Without wishing to be bound by theory, sound waves traveling in each respective main chamber in the upstream segment can traverse the perforated first wall and interact with sound waves traveling in the adjacent main chamber. These interactions can advantageously result in a cancellation phenomenon that reduces the total intensity of low frequency vibrations.

The mass air flow sensor flow tube 130, which is also formed in the upstream segment 120 of the molded body, bifurcates the first wall such that an outer surface of the flow tube wall defines an inner surface in each respective main chamber. The flow tube is aligned with a central axis of the assembly and defines a substantially cylindrical MAFS flow chamber 134. The flow tube comprises a solid (non-perforated) wall and has a bell mouth opening 132 at an upstream end thereof.

According to one embodiment, the MAFS flow tube 130 can have an inner diameter of from about 25 to 45 mm, preferably about 35 mm and the diameter of the bell mouth opening can range from about 40 to 60 mm, preferably about 50 mm. The length of the flow tube can be from about 75 to 100 mm.

A preferred assembly has an overall length of from about 200 to 250 mm, and an outer diameter of from about 100 to 150 mm. Thus, the length of the flow tube is preferably 50% or less of the overall length of the assembly, and the cross sectional area of the flow tube is preferably 50% or less, more preferably 25% or less, of the cross sectional area of the inner volume.

The molded body also includes a cut away section 126 formed in the first wall 122 at a downstream end of the flow tube 130. The cut away section 126 can reduces the restriction of air flow exiting the flow tube. By providing the cut away section, a cross sectional edge 128 of the first wall 122 is displaced a finite distance from the radial plane of the downstream end of the flow tube 130 and thus does not immediately obstruct air flow as it exits the flow tube. In one embodiment, the cut away section 126 has a semicircular shape.

Air flow entering the assembly passes through the upstream segment 120 via either one of the two main axial chambers 152, 154 or via the flow tube 130. Advantageously, because the flow tube 130 is aligned concentrically with respect to a longitudinal axis of the assembly, air flow through the flow tube is less turbulent and has a more uniform velocity than the total air flow through the inner volume. Accordingly, by positioning the sensing portion 192 of the mass air flow sensor 190 within the flow tube, the mass air flow sensor measures only a portion of the air flow passing through the inner volume. The portion of the air flow measured by the sensor has a relatively uniform velocity and relatively low turbulence.

As noted above, in order to insert the mass air flow sensor 190 into the MAFS flow chamber 134, an aperture 136 is formed in a wall of the flow tube 130. Also, a notch 129 is formed in the first main wall 122 so as to be aligned with aperture 136. Likewise, the over-wrapped wire mesh 180 and acoustic foam 184 as well as the housing 200 have formed therein apertures 182, 186, 202 respectively, which are aligned with notch 129 and aperture 136 to permit a "drop-in" insertion of the mass air flow sensor 190.

Optionally, the molded body further comprises a pair of fastener receiving portions 138. Once inserted, the mass air flow sensor 190 can be secured to the assembly using fasteners 198 such as self-tapping screws. Such fasteners 198 can also be used to secure the pre-assembly to the housing.

Air flow passing through the upstream segment flows into the downstream segment. As noted above, the first wall 122 continues from the upstream segment 120 into the downstream segment 140. However, in the downstream segment, the first wall 122 comprises a solid (non-perforated) wall. Formed orthogonal to the first wall 122 and aligned axially with respect to the inner volume 150 is a second wall 142. Thus, in the downstream segment of the assembly, the inner volume 150 is subdivided into a total of four axial chambers

162, 164, 166, 168. Air flow exiting the assembly passes first through the downstream segment via one of the four axial chambers.

The downstream segment axial chambers are partitioned so as to reduce the intensity of high frequency vibrations (e.g., 1,500 to 15,000 Hz vibrations) emitted from the assembly. Partitions in the chambers are formed using a plurality of rings 163-169 that are arranged orthogonal to both the first and second walls, 122, 142 and which are concentrically aligned with respect to a central (longitudinal) axis of the assembly. Each of the rings 163-169 comprises a solid (non-perforated) wall at an outer circumference thereof. Together with the first and second walls, the rings further partition the downstream axial chambers into a plurality of sequential, acoustically tuned chambers 170. The four rings 163-169 shown in FIG. 1 divide the four downstream axial chamber into a total of twelve acoustically tuned chambers. According to one embodiment, the assembly can comprise from 3 to 6 rings.

Each ring comprises a central circular opening 163a, 165a, 167a, 169a. The openings permit the passage of air through the tuned chambers. According to a preferred embodiment, the diameter of each successive circular opening increases in the downstream direction. Furthermore, the axial spacing between each successive ring preferably decreases in the downstream direction.

The axial spacing of the rings and the diameter of the circular openings effects a certain decibel reduction at a given frequency. For example, by moving the rings closer together, the same decibel reduction can be achieved at a higher frequency. By selecting the spacing between the rings and the size of the circular openings, the downstream segment can be tuned to reduce the intensity of low frequency vibrations that are emitted from the assembly.

Without wishing to be bound by theory, sound waves traveling through an acoustically tuned chamber can interact with sound waves traveling in adjacent acoustically tuned chamber chambers. This interaction can advantageously result in a cancellation phenomenon that reduces the total intensity of high frequency vibrations.

According to an alternate embodiment, the downstream segment can comprise two separate and parallel walls that are each formed orthogonal to the first wall 122. With such a configuration, a downstream segment having four rings would be subdivided into eighteen tuned chambers. By increasing the number of tuned chambers (e.g., from 12 to 18), the axial cross-sectional area of each tuned chamber decreases resulting in increased acoustic attenuation at higher frequencies.

In the downstream segment 140, an outer circumferential edge of each ring provides support for the overlying wire mesh 180. The wire mesh is also supported in the downstream segment by the outward facing edges 127, 147 of the first and second walls 122, 142. In the upstream segment, the wire mesh 180 is supported by the outward facing edges 127 of the first wall 122. The wire mesh prevents the overlying acoustic foam 184 from being deformed and drawn into the axial chambers by a negative pressure that can develop within the inner volume during operation of the engine.

According to one embodiment, the wire mesh has a thickness of less than about 0.3 mm, and the acoustic foam has a thickness of from about 5 to 20 mm, preferably about 10 mm. The thickness of the first wall, second wall, flow tube, and each ring 163-169 can be from about 1.5 to 3 mm, preferably about 2 mm.

Preferred wire mesh is formed from stainless steel and has a mesh opening of about 3 mm×3 mm, though other mesh materials and openings can be provided. Preferred acoustic foam can be any porous, open-celled synthetic resin material such as material derived from ethylene propylene diene monomer (EPDM). The molded body 110 can be formed by injection molding from materials such as polypropylene.

The assembly is preferably incorporated into the air induction system of an internal combustion engine. Specifically, the assembly is adapted to be incorporated downstream (i.e., on the clean air side) of an air filter, and upstream of an engine's throttle body. According to a first embodiment described above with reference to FIG. 1, the pre-assembly can be inserted into a housing that forms an outlet to a filter box. With such a configuration, the housing preferably includes a circumferentially-raised bead 212 at a downstream end thereof. Such a bead can be used to secure a flexible hose such a rubber hose over the downstream end of the housing, typically in cooperation with a hose clamp. The downstream hose can be connected to an input of a throttle body.

Figure 2:
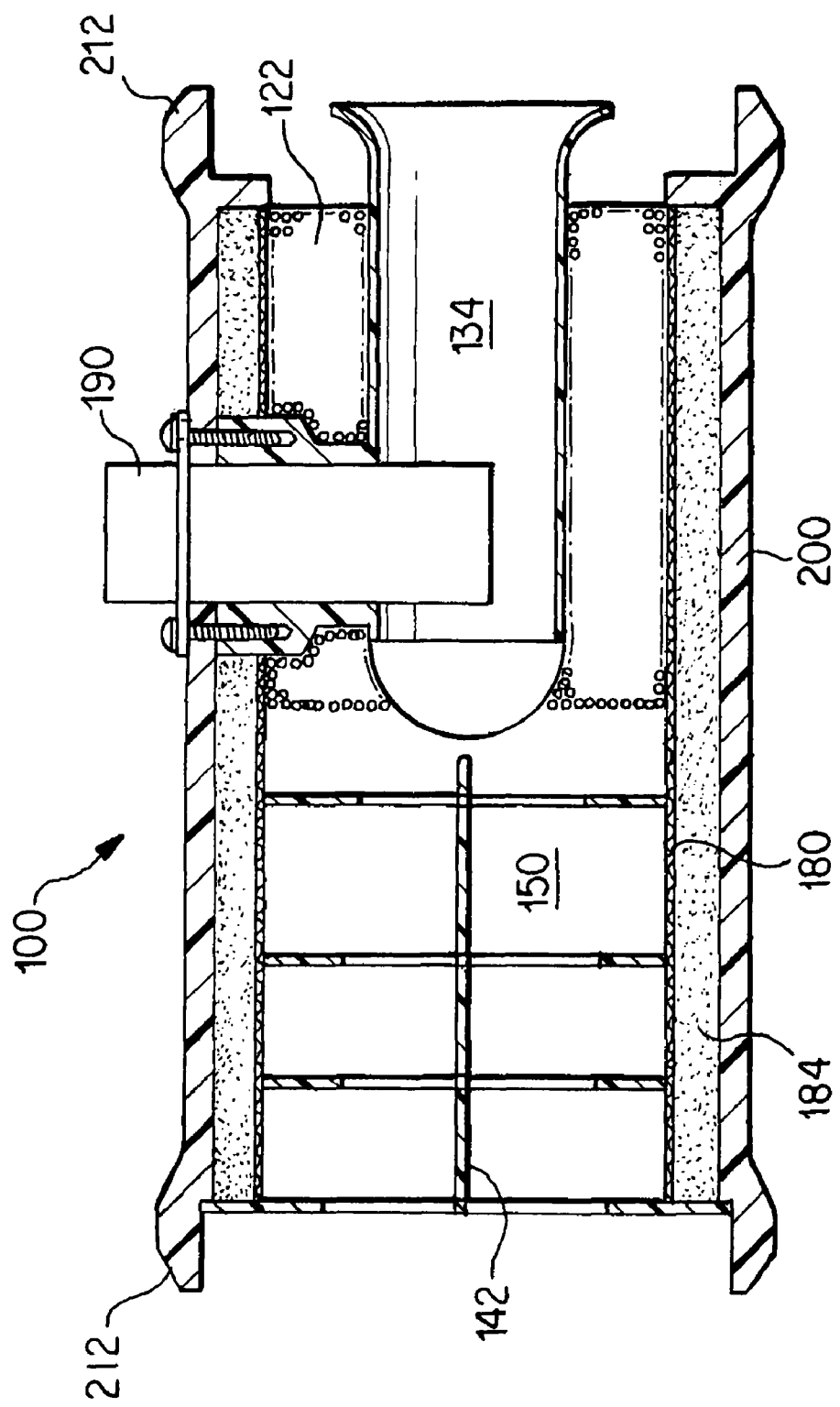
FIG. 2 shows an integrated mass air flow sensor/broadband silencer assembly according to a second embodiment of the invention.

According to an alternative embodiment, which is shown in FIG. 2, the assembly can be inserted into a free-standing housing, which in turn can be attached to an air induction system. Such a free-standing housing preferably includes circumferentially-raised beads at both a downstream end and an upstream end thereof. Thus, as in the embodiment of FIG. 1, the downstream end of the free-standing housing can be connected to a downstream component in an air induction system, such as an input duct to a throttle body. The upstream end of the free-standing housing can be connected to an upstream component in an air induction system such as an output duct of an air filter. The downstream connection and the upstream connection can be made using a flexible (e.g., rubber) hose and a hose clamp.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An air induction assembly adapted to be incorporated in an air intake system of an internal combustion engine, said air induction assembly comprising:
   a housing;
   a substantially cylindrical molded body fitted within said housing, said molded body having an upstream segment and a downstream segment,
   a layer of wire mesh formed over a circumferential outer surface of the molded body;
   a layer of acoustic foam formed over an outer surface of the wire mesh; and
   a mass air flow sensor inserted into an inner volume of the molded body, wherein the molded body comprises:
   a first wall extending along a longitudinal axis of the molded body, said first wall comprising a plurality of perforations within the upstream segment;
   at least one second wall formed within said downstream segment orthogonal to the first wall and aligned with a longitudinal axis of the molded body;
   a plurality of rings formed within the downstream segment, each ring concentrically aligned with respect to a longitudinal axis of the molded body and having a central circular opening; and
   a mass air flow sensor flow tube formed within the upstream segment and aligned with a longitudinal axis of the molded body, said mass air flow sensor flow tube bifurcating the first wall within the upstream segment.

2. An air induction assembly according to claim 1, wherein the molded body is formed from a synthetic resin material.

3. An air induction assembly according to claim 1, wherein the each of the first wall, the second wall, the mass air flow sensor flow tube, and the plurality of rings have a thickness of from about 1.5 to 3 mm.

4. An air induction assembly according to claim 1, wherein the wire mesh comprises stainless steel.

5. An air induction assembly according to claim 1, wherein the wire mesh has a thickness of less than about 0.3 mm.

6. An air induction assembly according to claim 1, wherein the acoustic foam comprises ethylene propylene diene monomer.

7. An air induction assembly according to claim 1, wherein the acoustic foam has a thickness of from about 5 to 20 mm.

8. An air induction assembly according to claim 1, wherein an overall length of the assembly is from about 200 to 250 mm.

9. An air induction assembly according to claim 1, wherein an outer diameter of the assembly is from about 100 to 150 mm.

10. An air induction assembly according to claim 1, wherein the molded body comprises a pair of fastener receiving portions.

11. An air induction assembly according to claim 1, wherein the housing comprises an outlet duct of a filter box.

12. An air induction assembly according to claim 11, wherein the housing comprises a circumferentially-raised bead at a downstream end thereof.

13. An air induction assembly of claim 1, wherein the housing comprises a free-standing housing.

14. An air induction assembly according to claim 13, wherein the housing comprises circumferentially-raised beads at a downstream end and at an upstream end thereof.

15. An air induction assembly according to claim 1, wherein the length of the upstream segment is approximately equal to the length of the downstream segment.

16. An air induction assembly according to claim 1, wherein the size of the perforations is from about 0.1 to 5 mm.

17. An air induction assembly according to claim 16, wherein the size of the perforations is from about 0.1 to 2 mm.

18. An air induction assembly according to claim 1, wherein the perforations are sized and spaced to reduce the intensity of low frequency vibrations in the upstream segment.

19. An air induction assembly according to claim 1, wherein the mass air flow sensor is inserted into the mass air flow sensor flow tube via an aperture formed in the mass air flow sensor flow tube.

20. An air induction assembly according to claim 1, wherein the mass air flow sensor flow tube has an inner diameter of from about 25 to 45 mm.

21. An air induction assembly according to claim 1, wherein the mass air flow sensor flow tube has a length of from about 75 to 100 mm.

22. An air induction assembly according to claim 1, wherein the first wall comprises a semicircular cut away downstream of the mass air flow sensor flow tube.

23. An air induction assembly according to claim 1, wherein the assembly comprises from 3 to 6 rings.

24. An air induction assembly according to claim 1, wherein the diameter of each successive circular opening increases in a downstream direction.

25. An air induction assembly according to claim 1, wherein an axial spacing between each successive ring decreases in a downstream direction.

26. An air induction assembly according to claim 1, wherein the downstream segment comprises two separate parallel second walls that are each formed orthogonal to the first wall and which are aligned with a longitudinal axis of the molded body.

27. An air induction assembly according to claim 1, wherein the plurality of rings are sized and spaced to reduce the intensity of high frequency vibrations in the downstream segment.

28. A method of forming an air induction assembly adapted to be incorporated in an air intake system of an internal combustion engine, said method comprising:
    forming a substantially cylindrical molded body having an upstream segment and a downstream segment;
    wrapping a layer of wire mesh over a circumferential outer surface of the molded body;
    wrapping a layer of acoustic foam over an outer surface of the wire mesh to form a pre-assembly;
    inserting the pre-assembly into a housing; and
    inserting a mass air flow sensor inserted into an inner volume of the molded body to form the assembly;
  wherein the molded body comprises:
    a first wall extending along a longitudinal axis of the molded body, said first wall comprising a plurality of perforations within the upstream segment;
    at least one second wall formed within said downstream segment orthogonal to the first wall and aligned with a longitudinal axis of the molded body;
    a plurality of rings formed within the downstream segment, each ring concentrically aligned with respect to a longitudinal axis of the molded body and having a central circular opening; and
    a mass air flow sensor flow tube formed within the upstream segment and aligned with a longitudinal axis of the molded body, said mass air flow sensor flow tube bifurcating the first wall within the upstream segment.

29. The method of claim 28, further comprising securing the housing and the mass air flow sensor to the pre-assembly via fastener receiving portions formed in the pre-assembly using a plurality of fasteners.

\* \* \* \* \*